United States Patent [19]
Windsor et al.

[11] Patent Number: 5,734,706
[45] Date of Patent: Mar. 31, 1998

[54] CALLER IDENTIFICATION AND DATA RETRIEVAL SYSTEM

[76] Inventors: Victoria Brein Windsor; Ronald Glenn Hartley, both of P.O. Box 8667, Roanoke, Va. 24014

[21] Appl. No.: 643,862

[22] Filed: May 7, 1996

Related U.S. Application Data

[63] Continuation-in-part of Ser. No. 508,231, Jul. 27, 1995.

[51] Int. Cl.$^6$ .................... H04M 15/00; H04M 15/06
[52] U.S. Cl. .................... 379/142; 379/112; 379/113; 379/127; 379/130
[58] Field of Search ........................ 379/112, 113, 379/114, 127, 130, 131, 140, 142, 245, 246, 354

[56] References Cited

U.S. PATENT DOCUMENTS

| | | | |
|---|---|---|---|
| 4,924,496 | 5/1990 | Figa et al. | 379/142 |
| 4,994,797 | 2/1991 | Breeden | 379/142 |
| 5,146,490 | 9/1992 | Beckman | 379/354 |
| 5,388,150 | 2/1995 | Schweyer | 379/142 |
| 5,526,406 | 6/1996 | Luneau | 379/142 |
| 5,535,265 | 7/1996 | Suwandhaputra | 379/140 |

*Primary Examiner*—Curtis Kuntz
*Assistant Examiner*—Vijay Shankar
*Attorney, Agent, or Firm*—Davis, Graham & Stubbs, LLP

[57] ABSTRACT

A method and apparatus for identification through telephony signaling, including formatting an incoming or outgoing basic telephone signal, and storing or retrieving information pertaining thereto. A conversion device is connected on the tip and ring side of a telephonic device. The caller identification information provided by the telephone company on incoming calls or the dual tone multiple frequency signal on outgoing calls is formatted into ASCII character text which is used as an index to a relational database. Information relating to the formatting signal is read and/or written to the database, and displayed on a display unit or printed, while the call is in progress.

14 Claims, 14 Drawing Sheets

| Name | Number | Date/time | Incoming | Line |
|---|---|---|---|---|

FIG. 5A

| Name | Number | Date/time | Outgoing | Line |
|---|---|---|---|---|

FIG. 5B

| — | IDRS 2001 | ▽ ▲▼ |

File  Database

| View Calls | Transfer | Phone Log Notes | Save Notes | Close |

PHONE LOG NOTES

CALL ID NAME:

DATE OF NOTE:                TIME:

NOTES: [                    ]

FIG. 7B

IDRS 2001

File  Database
View Calls | Transfer | Phone Log Notes | Save Notes | Close

PHONE LOG

| Line | Date | Number | Type | Name | Start Time | End Time | Client Record | Notes |
|---|---|---|---|---|---|---|---|---|
| 8 | 2/22/95 | (303) 555-6000 | IN | Windsor B | 9:28:00AM | 9:45:45 AM | R | N |
| 1 | 2/22/95 | (804) 555-0000 | IN | Hartley G | 9:28:00AM | 9:45:45 AM | R | N |
| 2 | 2/22/95 | (804) 555-2000 | IN | Windsor V | 9:48:00AM | 9:55:45 AM | R | N |
| 3 | 2/22/95 | (804) 555-7000 | IN | Smith J | 9:28:00AM | 9:45:45 AM | R | N |
| 5 | 2/22/95 | (303) 555-8000 | IN | Harley R | 9:28:00AM | 9:45:45 AM | R | N |
| 4 | 2/22/95 | (303) 555-6000 | IN | Windsor V | 9:50:00AM | 9:57:45 AM | R | N |

FIG. 7C

```
┌─────────────────────────────────────────────────────────────────┐
│ −          IDRS 2001 (CLIENT RECORD)                      ▽  ⬍ │
│ File  Database                                                  │
│ ┌─────────┬─────────┬─────────┬─────────┬─────────┐            │
│ │   NEW   │  SAVE   │  PRINT  │ DELETE  │  CLOSE  │            │
│ └─────────┴─────────┴─────────┴─────────┴─────────┘            │
│ ┌───────────┐  ┌────────────┐  ┌───────────┐  ┌───────────┐    │
│ │ WORKSPACE │  │ PHONECALLS │  │ NEW NOTES │  │ OLD NOTES │    │
│ └───────────┘  └────────────┘  └───────────┘  └───────────┘    │
│                      CLIENT RECORD                              │
│                                                                 │
│      CALL ID NAME:              COUNTRY:                        │
│                                                                 │
│      CLIENT ID:                 CONTACT NO:                     │
│                                                                 │
│      LAST NAME:                 FAX NO:                         │
│                                                                 │
│      FIRST NAME:                CELLULAR NO:                    │
│                                                                 │
│      COMPANY                    PAGER NO:                       │
│                                                                 │
│      ADDRESS:                                                   │
│                                                                 │
│      SUITE OR P.O. BOX:   CITY:        STATE:       ZIP:        │
│                                                                 │
│                       OTHER NUMBERS                             │
│              ┌──────────────┬──────────────────┐                │
│              │    NUMBER    │   DESCRIPTION    │                │
│              ├──────────────┼──────────────────┤                │
│              │              │                  │                │
│              ├──────────────┼──────────────────┤                │
│              │              │                  │                │
│              ├──────────────┼──────────────────┤                │
│              │              │                  │                │
│              └──────────────┴──────────────────┘                │
└─────────────────────────────────────────────────────────────────┘
```

FIG. 7D

| | IDRS 2001 - (CURRENT STATUS) | | | | | |
|---|---|---|---|---|---|---|
| File Database | | | | | | |
| Close | | | | | | |

| Line | Date | Number | Type | Name | Start Time | End Time |
|---|---|---|---|---|---|---|
| 1 | 02/22/95 | (804)555-5000 | IN | WINDSOR B | 10:30:45AM | |
| 2 | | | | INACTIVE | | |
| 3 | 02/22/95 | (804)555-3000 | IN | R HARTLEY | 10:35:14AM | |
| 4 | | | | INACTIVE | | |
| 5 | | | | INACTIVE | | |
| 6 | | | | INACTIVE | | |
| 7 | | | | INACTIVE | | |
| 8 | | | | INACTIVE | | |

FIG. 7E

CALLER IDENTIFICATION AND DATA RETRIEVAL SYSTEM

This is a continuation-in-part of U.S. patent application Ser. No. 08/508,231, filed Jul. 27, 1995. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to caller identification systems, and more particularly to a service for identification of both incoming and outgoing calls at a telephone user's station or other location, on or off site, tied directly into a micro, mini or main frame computing device for the storage, retrieval, display, direct caller data entry, by the user, and/or printing or specific service information about the calls at the telephone users location or other location selected by the user. Further, the invention provides multiple clocks and call timing, directed and specific for calls received and call end times, direct CD ROM directory, other in house or off site on line computing systems data bases, and Teleco directory data base with cross links. The invention reads and down loads the data, and cross checks for a specific, relevant or group informational match, along with voice recognition storage and transmittal. The invention further allows for selective call reject of some calling parties through the software setup and configuration. The invention includes hardware, software, and firmware.

BACKGROUND OF THE INVENTION

Caller identification service, known as 'Caller ID' provides a valuable service to telephone subscribers by allowing the called party to identify the calling party prior to accepting the call. The term caller identification service means a service which makes use of a display device at the called party's telephone to automatically indicate the local telephone number, with or without the area code, of any party calling from within the local area or from another area. This is accomplished by interexchange carriers passing a protocol service known as the automatic number identification 'ANI' that identifies the calling party's telephone number to end users. The term automatic number identification means an access signaling protocol in use by common carriers that uses an identifying signal associated with the use of subscriber's telephone, usually for providing billing information or other information to the local exchange carrier and to other interconnecting carriers.

The Caller ID, ANI, ISDN, and EMS 911 signal format is transmitted via the tip and ring leads directly from the telephone company's central office. This service is subscribed to by the end user, and is provided at a charge from the local telephone company. The Caller ID signal is forwarded by the local telephone company in a specific data stream format between the first and second ringing cycle, when the subscriber is on-hook. The signal is also sent during the quiet time between the call waiting tones in some service arrangements, when the subscriber is off-hook. The telephone company's Caller ID signal is sent during the quiet time between tone or ringing signals in a specific format arrangement and is available to a consumer subscribing to such service.

There are a variety of display station sets and other means in existence for displaying at a called station the directory number of a calling station during a silent interval between ringing signals from the telephone switching office. The display station sets available today are commonly a one or two line display device coupled to a telephone station which displays the number that an incoming telephone call was dialed from.

One such display station is that disclosed in U.S. Pat. No. 4,582,956 of Doughty which teaches a method and apparatus for displaying special service information at a selected station during a silent interval between ringing. A frequency shift keyed demodulator detects incoming modulated and unmodulated carrier signals which have been filtered from the ringing signals. Upon detecting the unmodulated carrier signals, the FSK demodulator signals a UART to receive special service information demodulated from the subsequently received modulated carrier signal. Each received character of the special service information is then stored in data memory by the program controlled microprocessor. The stored special service information is then exhibited in the display unit under the control of a microprocessor. The display is initiated during the silent interval and remains until cleared. The special service information includes the directory number of the calling station, time of day, a called station directory number, or other desired information.

The limitations of prior art Caller ID display stations and systems are readily apparent. For example, some are limited to identification of the calling party number only, lacking in the ability to display information on the called party at the calling station. Others, which do display the caller's name, are typically an LED or liquid quartz display and not an interactive graphical user interface (GUI). The display devices are limited in their ability to capture and save the calling or called party information. Once the information is cleared from the device, it is gone. If the information on the signal received is unusable, the prior art devices do not include a fall back system likely to reproduce the unusable portion of the signal. Additionally, most prior art systems do not have the ability to store or display historical information on past calls, or display other pertinent information about the calling or called party. Those systems which do store limited information about a calling party which includes name, number, time and date have storage limitations in the range of 25 to 90 entries.

The present invention is intended to overcome one or more of the problems with the prior art caller identification systems discussed above.

SUMMARY OF THE INVENTION

The invention is a method and system for extracting and formatting information from basic telephone signals, either incoming or outgoing, and storing, displaying and/or printing information pertaining thereto. It is the object of the present invention to provide a microprocessor based conversion device coupled to both a telephone station and a computer system for the display to a user of an interactive interface which includes call information. The conversion device strips off information from a telephone signal and formats the information into a packet transmission in combined codes of ASCII and binary character string. The conversion device is capable of converting both incoming and outgoing signals. The formatted information is sent to the computer system where it is used as an index to a database containing information about the calling or called party. While the call is in progress, from the inception and start of the ringing, a display unit, normally a micro, mini, specialized, or main frame computing device, coupled with specialized software, indicates to the user the calling or called party's name, date, time, call history and other information desired for the particular application of present invention.

The system and method of the present invention have a wide range of applications which include both service organizations and professional offices, as well as emergency or security services. For example, the system of the present invention is useful where background data, policy numbers and ordering data is useful, or in dispatch and delivery systems. In professional offices, the system of the present invention is useful in tracking billing information. The system and method of the present invention have particular applicability to the area of law enforcement and emergency dispatch systems where past history, medical or criminal information is of critical immediate importance. In the disclosure which follows, use of the invention in the law enforcement context is described, however it is understood that this is not limiting but rather exemplary.

It is the object of the present invention to provide identification of both incoming and outgoing calls. The present invention provides the calling/called party's name and number along with instant retrieval of the calling or called party's records. The present invention provides the time, date and duration of the call, along with a chronological record of calls to and from the calling or called party. Time and date recording (referred to by the inventors of the present invention as "PHONE PRINT", along with ability to record the location of the call) may be extremely accurate by the use of multiple clocks, both internal to the device and external to the device, so as to be able to provide the requisite level of reliability for law enforcement use and introduction into evidence.

The system of the present invention works generally as follows. When an incoming call is detected at a telephone station, the voltage from the central office ringing signal is stripped from the line, and the microprocessor in the conversion device scans the signal for the data stream as transmitted from the telephone company. The signal is then demodulated and placed into a special format for use with computing system of the present invention. Simultaneous with the call being connected at the telephone station, a signal is sent to the computing system it is attached to. The call information in the formatted signal is used as an index to a relational database. Information in the database is then displayed on a display unit. The display includes the line the call is made on or from, the telephone number, the time of the call from start to end, the date, the caller or called party's name, and any other database records available to show the history of the past contacts with the calling or called party. Processing of an outgoing call is similar to that of an incoming call, except that rather than stripping the voltage off the incoming signal, the conversion device converts the DTMF tone (dual tone multiple frequency data signals) into the called number, attaches the time of the call and the line number the call was placed on, and then processes the information as previously described. A preferred embodiment of the device also includes the use of three internal clocks and or timing devices to ensure a high level of time stamping of the receipt of the call or time at which a call was made. One of these clocks is controlled externally for the purpose of "PHONE PRINT" on a call to or from law enforcement groups. This does not limit the use of the device to law enforcement, or any other, specific entities. The device allows and is programmed for specific "Phone Print" identification of the calling or called entity, person or number, including, but not limited to, local, national, or international calls. The device also recognizes the dialed or calling number and associates the number with the specific data base or data bases assigned or recognized by the device, connections, or software so required to perform the functions with and in conjunction for the total integration of the data bases and information recognition, storage, and retrieval systems so attached and connected.

It is another object of the present invention to provide for a status checking facility in the conversion device which allows the device to determine if the computing system is powered on or off (referred to by the inventors of the present application with the trademark "WATCH DOG COMMAND"), and the availability of the control software executing therein. If the computing system is unavailable, the conversion device stores into memory the formatted signal for later processing (referred to by the inventors of the present application with the trademark "AUTO STORE".)

BRIEF DESCRIPTION OF THE FIGURES

FIGS. 5A–5B represent the formatted incoming and outgoing basic signals according to the present invention.

FIGS. 7A–7E are exemplary screens that may constitute a portion of the user interface of the present invention. Copyright 1995 Security Products InterNational Inc. Inter-Continental Communications (17 U.S.C. 401).

DETAILED DESCRIPTION OF THE PREFERRED EMBODIMENTS

Figure 1:
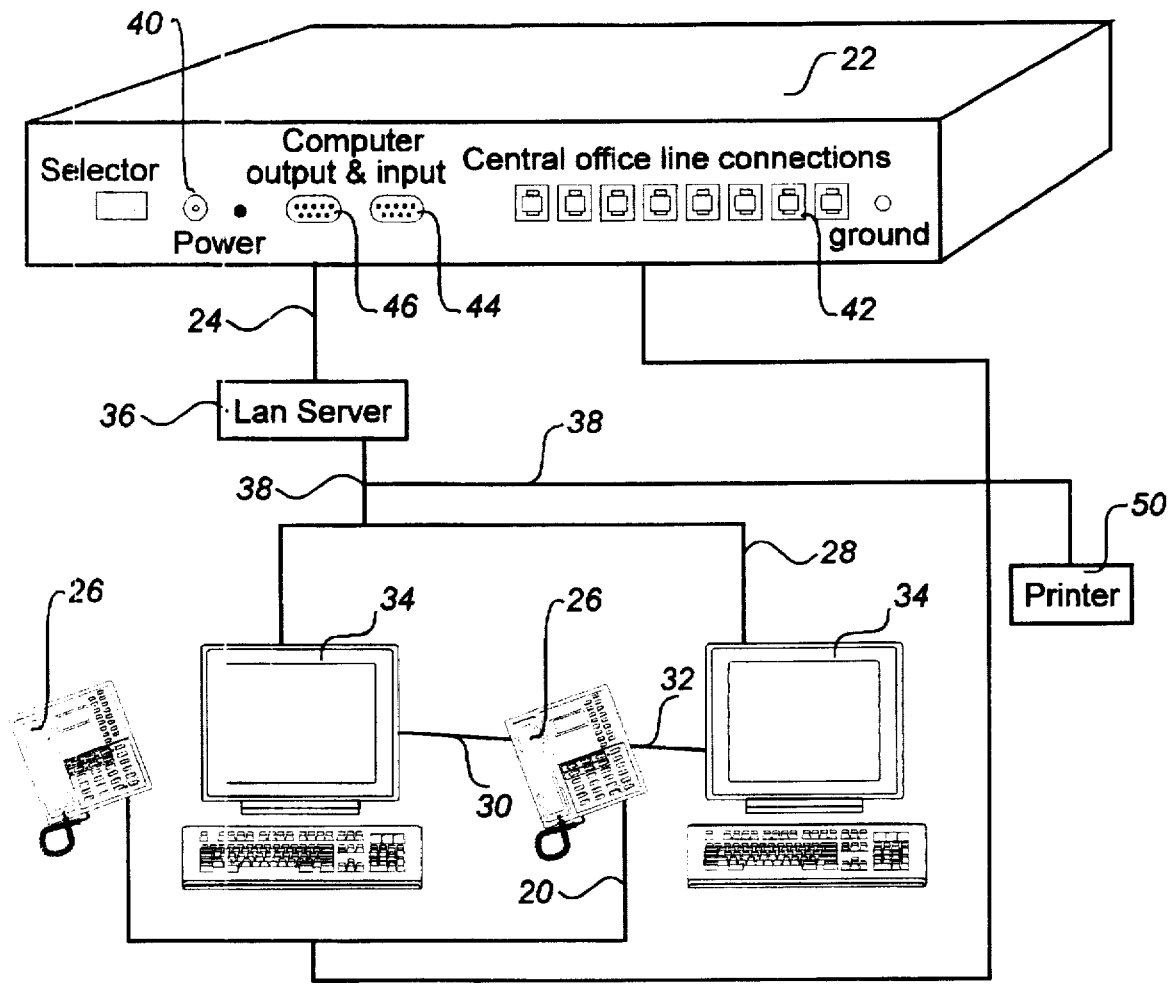
FIG. 1 is a perspective view of the system of the invention.
Figure 2:
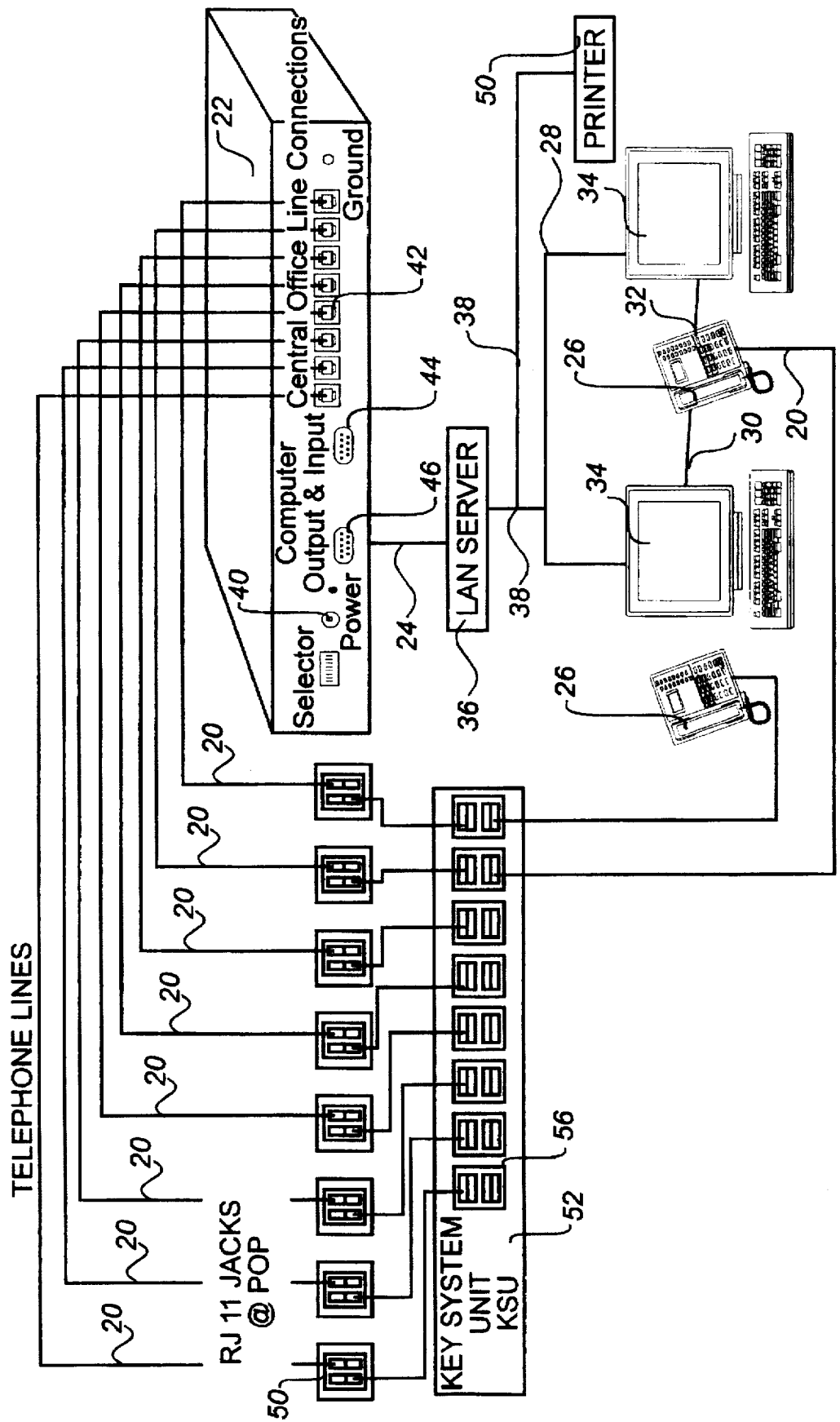
FIG. 2 shows a perspective view of the conversion device of the present invention, showing the device's capability of handling up to eight telephone lines.

As seen with reference to FIG. 1, the system of the present invention includes a conversion unit 22 coupled to both a telephone station 26 and a computer system 34 by means of data and control connections 32 and 30. The system of the present invention is coupled to the switched telephone loop 20 located at the telephone company's point of presence at a subscriber's location. The switched telephone line 20 consists of a telephone tip line and a telephone ring line. Although only one telephone line 20 is required for proper operation of the system of the present invention, the system is capable of handling a number of telephone lines ranging from one to eight or more phone lines, as seen in FIG. 2.

The conversion device 22 connects to the telephone company's interface, in either a parallel or serial connection format, on the tip and ring side of the telephone line 20. Optionally, the connection may be done directly and allow a pass through of the signal to a well known telephonic device 26 or in parallel with the telephonic device 26.

The conversion device 22 may either be a stand alone device or in a computer interface board format for direct installation into any well known microprocessor, macroprocessor, or mainframe computing device and/or other specialized computing equipment.

In a preferred embodiment, the conversion device 22 of the present invention is a microprocessor based stand alone unit which is responsive to an incoming ring signal, dial signal and dual tone multiple frequency data signals.

As seen in FIG. 2, the conversion device 22 is designed to allow up to eight telephone or central office lines to be connected directly to each of the eight individual circuits designed to decode the Caller ID, ANI, ISDN and other incoming signals, and multi-frequency tones as generated on an outgoing telephone call. Each signal circuit is a stand alone entity that allows the instantaneous processing of the signals by line without dependency upon shared circuit processing.

Figure 3:
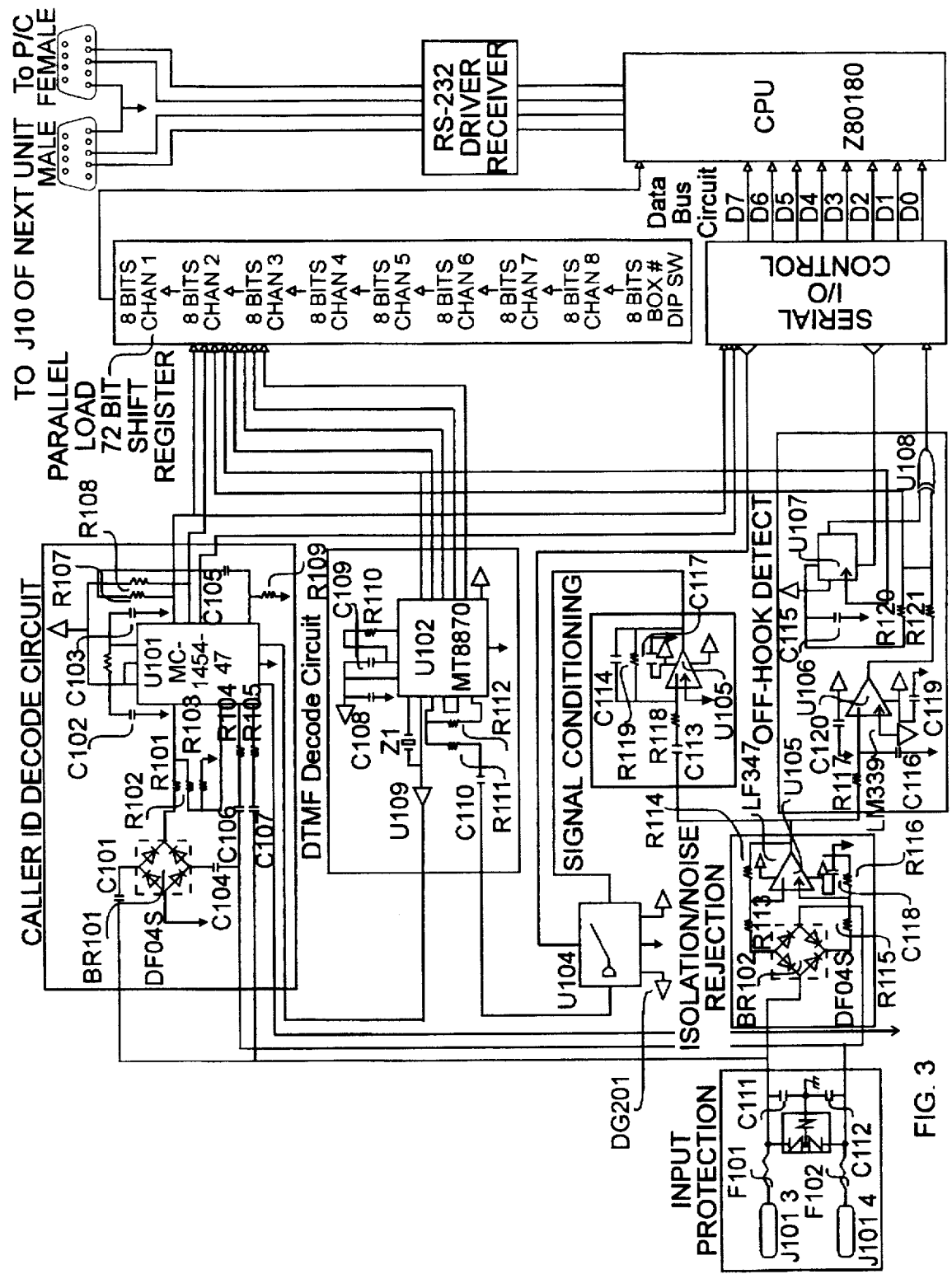
FIG. 3 shows an embodiment of the incoming and outgoing call circuitry in the conversion device of the present invention.

An embodiment of the call processing circuitry is generally shown in FIG. 3. FIG. 3 shows an example of the interface circuit area (as previously mentioned, up to eight of these circuits may be included in the device); the microprocessor circuit; and the detection and amplification circuit. Each aspect of the circuitry is described in turn below. An advantage of the circuit of FIG. 3 is that it fully complies with the United States Federal Communications Commission (FCC) requirements for the registration of telephone and data terminal equipment. Without such registration, a circuit accomplishing the aspects of the present invention would have limited commercial value.

In a preferred embodiment, the interface circuit area shown consists of an RJ11 or RJ14 type of jack for telephone company line termination, although some models may include 25 pin cable type connector. The circuit includes a voltage resistance and bleed circuit which strips off the ringing voltage and current, and identifies on and off-hook conditions. In an on-hook situation when ringing is detected, the signal is conditioned for the decoder chip. Such conditioning decreases the voltage forwarded to the U-106 relay. The selected relay determines the proper flow and directs the signals, which includes the caller ID signals, to the proper microchip controller. In an on-hook condition and signal, the ringing current sent from the telephone company is recognized by the circuitry. The data and voltage are stripped from the line and forwarded to a chip for further processing and signal determination. In a preferred embodiment, the chip is an MC145447 as manufactured by Motorola. A selector relay determines the switched path for the signal to flow in. The determination is selected by the type of signal received and whether it is a DTMF tone signal generated by the end users equipment, or a ringing tone signal as sent by the telephone company. In an off-hook condition, the DTMF frequency as recognized activates the U-107 and directly passes the DTMF signals to a Mitel DTMF decode chip U-102. When either ringing or tone is detected, the U-105 chip converts the relay to establish an on condition for the microchip for incoming tone differential and use.

With further reference to FIG. 3, it can be seen that the detection and amplification circuit consists of those components which allow the Caller ID signal to be determined and amplified in level so that it can be forwarded to the microprocessor. As previously mentioned, basic detection of signals as provided by the telephone company may be accomplished with a chip (MC145447) as manufactured by Motorola Corporation. This basic chip decodes the Caller ID signal and forwards the signal to the UART and microprocessor for further application and processing. Next, the UART converts the signal into the parallel format for the on board processor to read, and generates an interrupt sequence when further ringing is detected on the line. As such, the information is placed into a storage file via the data bus, until the second ringing signal has ceased. Unlike the prior art devices, no data is lost in this process due to the handshake and storage into the on-board microprocessor.

If an error is detected, the information received from the telephone signal is deleted and an error field is created. A specialized applications program takes effect to eliminate the error signal. In specific terms, if an incomplete field is transmitted, by the telephone company, in the calling party's number data, but the calling party's name is received intact, the name is stored for further match and cross reference in the computing system database. This process is shown in detail in the flow diagram of FIG. 4D, which is subsequently described. The same is true with the name data field. If the calling party's name field is received incomplete but the number field is intact, the data will be stored for further processing by the attached computing system. This eliminates the requirement in 90% to 95% Of error signals being discarded as useless and an error message format being generated.

Upon such detection as an error the internal clock attaches a time to the call and an "Error" message along with the time is stored in the microprocessor memory in sequence with the other received calls.

Upon completion of proprietary checking and modifying of a callers information in the memory configuration, a check bit, or data stream, is sent to the connected computer 34 to ensure the external computer is in service or the control program is online. This process is shown in greater detail with reference to FIG. 4D. When a handshake occurs to verify a ready to receive from the external computer the information is downloaded to the external computer system 34 and removed from the conversion device's 22 memory configuration. If the external computer system 34 is either not powered on or the control program is off-line, the formatted signal is retained in memory until such time as a signal is received to download the data.

The basic memory configuration in the conversion device 22 is designed but not limited to 2000 units of caller information, either incoming, outgoing or a combination of both. The microcomputer also checks to determine if other units are online and connected to the main device 22. Such units are additional devices that have been connected via an DB9 or RJ45 connector in tandem, or a serial configuration, to allow more than 8 telephone lines to be accessed by the external computer 34. A preferred embodiment of the device 22 allows a configuration of up to a minimum 64 telephone numbers, or 8 total devices connected. It is readily understood that any number of devices connected together to enhance the capabilities of the system is within the scope of the invention. Currently there are no limiting factors as to a maximum number. The end result of such a connection establishes and output signal to be processed by the final device 22 in the chain for downloading to the external computer 34. Once the incoming or outgoing signal is formatted for use in the present invention, it is directly passed through the units in an unchanged format to the final device, in the manner that will be described.

There is a tagging process on the data that identifies the telephone line the data was received from starting with the number one line and continuing through the total number of lines connected in numeric order. The microprocessor of the device controls the connections and signal generation to the external computer 34.

Optionally, the conversion device 22 may be directly connected to a serial printer 50 for direct printing of the information pertaining to each call. In an exemplary environment, speed of such printing and computer interface is established at a minimum 9600 bps and is controlled by the microprocessor through designated dip switch connections to increase the speed up to 19.2 kbps. In the direct printer environment, the printer 50 would be recognized via the pin configuration in the microprocessor circuitry to establish an on-line connection. If an on-line connection is available directly to the printer 50, the signal would be forwarded directly to the printer 50 and printed verses sending the signal and data stream to the external computer 34. This is also a direct dip switch setting controlled by the user.

Not shown in the figures but included in the internal microprocessor is a self diagnostics check circuit. This circuit maintains a continuous check of the signal from all devices, and recognizes if there is an electronic or mechanical problem internally with the established circuit links (known as "Watch Dog" command and "Auto Store"). If such an error is detected with the microprocessor or circuit links, a message is sent to the external computer or printer to advise the user of the problem and to contact the manufacturer of the device and disable the device. The device is also designed to allow for direct LAN connections via an MS Windows NT Server arrangement, as was shown in FIGS. 1 and 2.

The outgoing call circuitry is readily viewed with reference to FIG. 3. The outgoing call circuitry, like the incoming call circuitry, consists of an interface circuit area and a microprocessor circuit. In the interface circuit area, it can be seen that the device 22 uses the existing RJ11, RJ14 and/or 25 pair connection to receive the outgoing signal as used in the incoming signal circuitry.

Figure 4A:
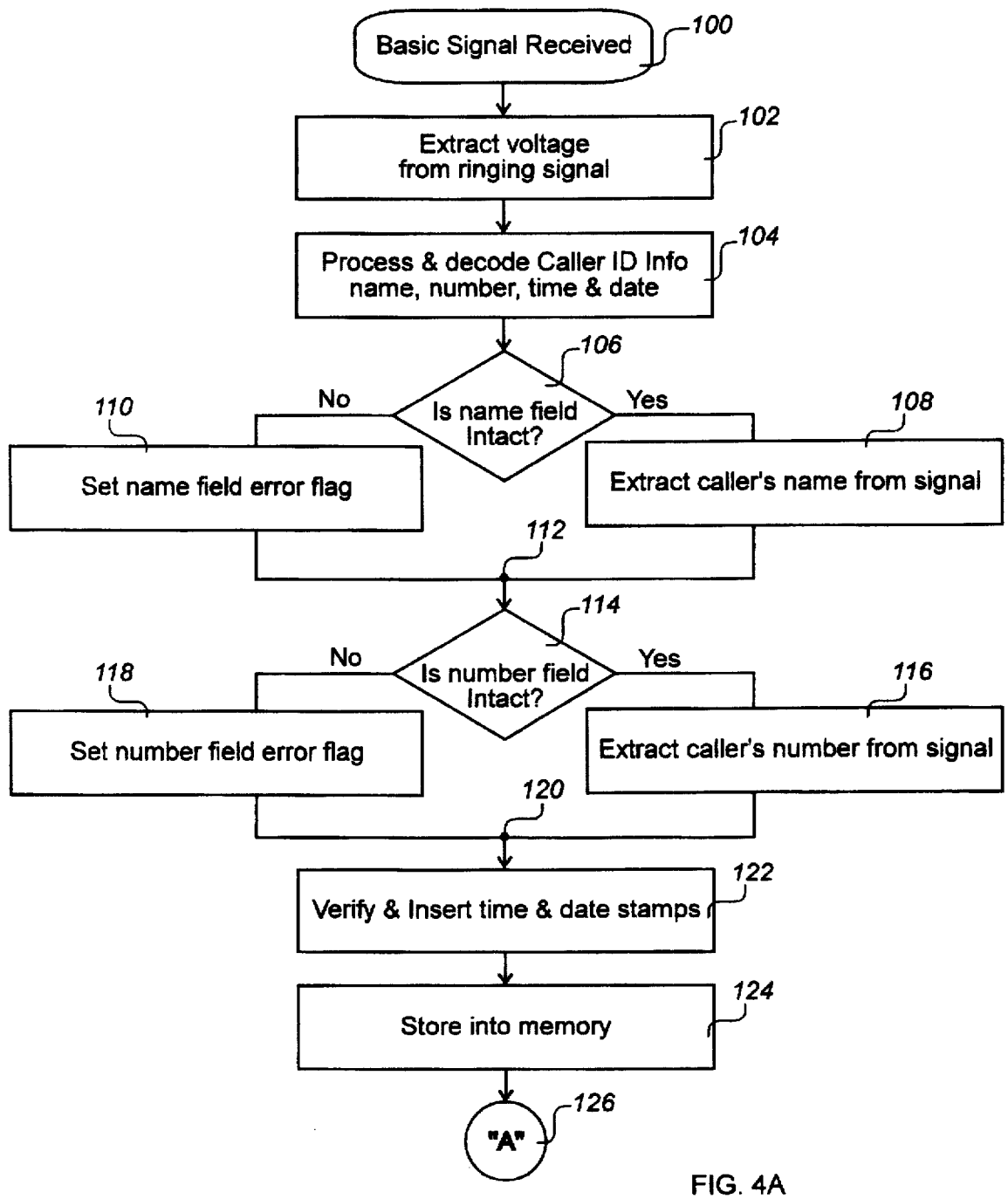
FIGS. 4A–4D are flow diagrams of the control software executing in the external computer system of the present invention.

Input signal processing is illustrated by the flow diagram shown in FIG. 4A. Initially, a basic incoming signal is received at step 100. At step 102, the voltage from the central office ringing signal is stripped from the line. The microprocessor circuit which was shown in FIG. 3 scans the signal to determine the Caller IDs information, number, name (where available), time and date at step 104. Error detection is provided to determine whether all fields as sent by the telephone company were received complete. At step 106, the system checks if the caller's name was received intact. If, at step 106, the name field was received intact, processing continues to step 108 where the caller's name is extracted from the signal and stored in an ASCII character format. If the name field was not received intact at step 106, the processing continues to step 110 where a name field error indicator is set. The system resumes at junction point 112, and proceeds into decision point 114, where the system checks to see if the calling party's number was received intact. If the calling party's number was received intact, then processing continues to step 116 where the calling party's number is extracted from the signal and stored in an ASCII character format. If, at step 114, the calling party's number was not received, the process continues to step 118 where a number field error indicator is set. Processing rejoins at junction point 120. A time stamp is stored with the call information at step 122, and the data is forwarded to the microprocessor memory for temporary storage at step 124. Processing continues to step 126 where reference character "A" indicates that processing in the conversion device 22 for an incoming call continues in FIG. 4C.

Figure 4B:
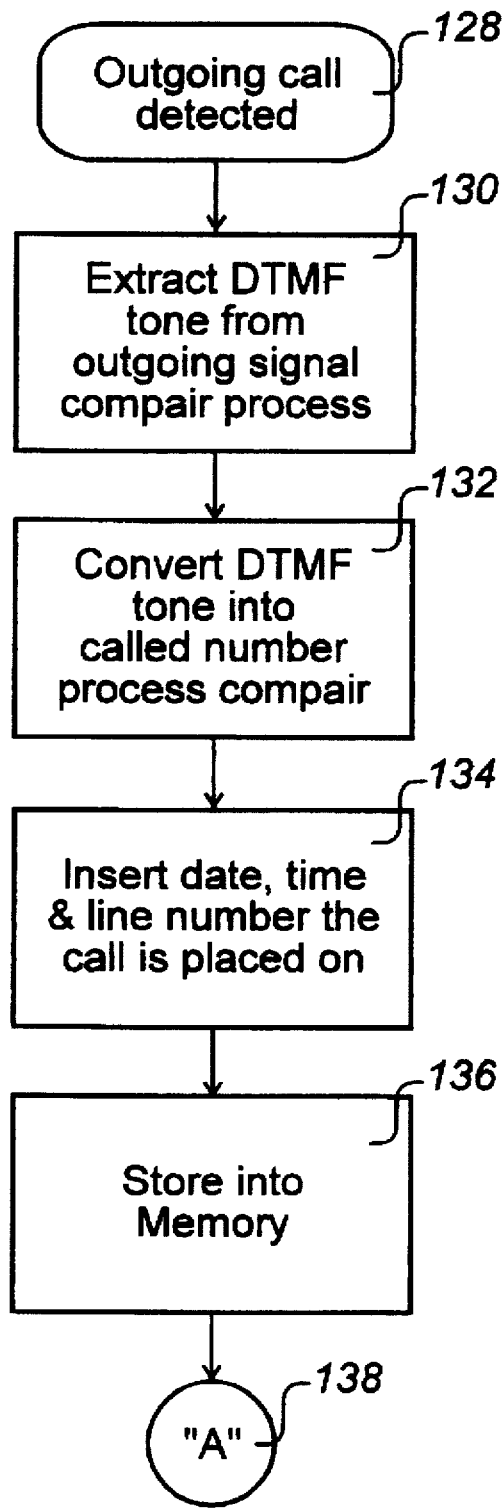
Figure 4C:
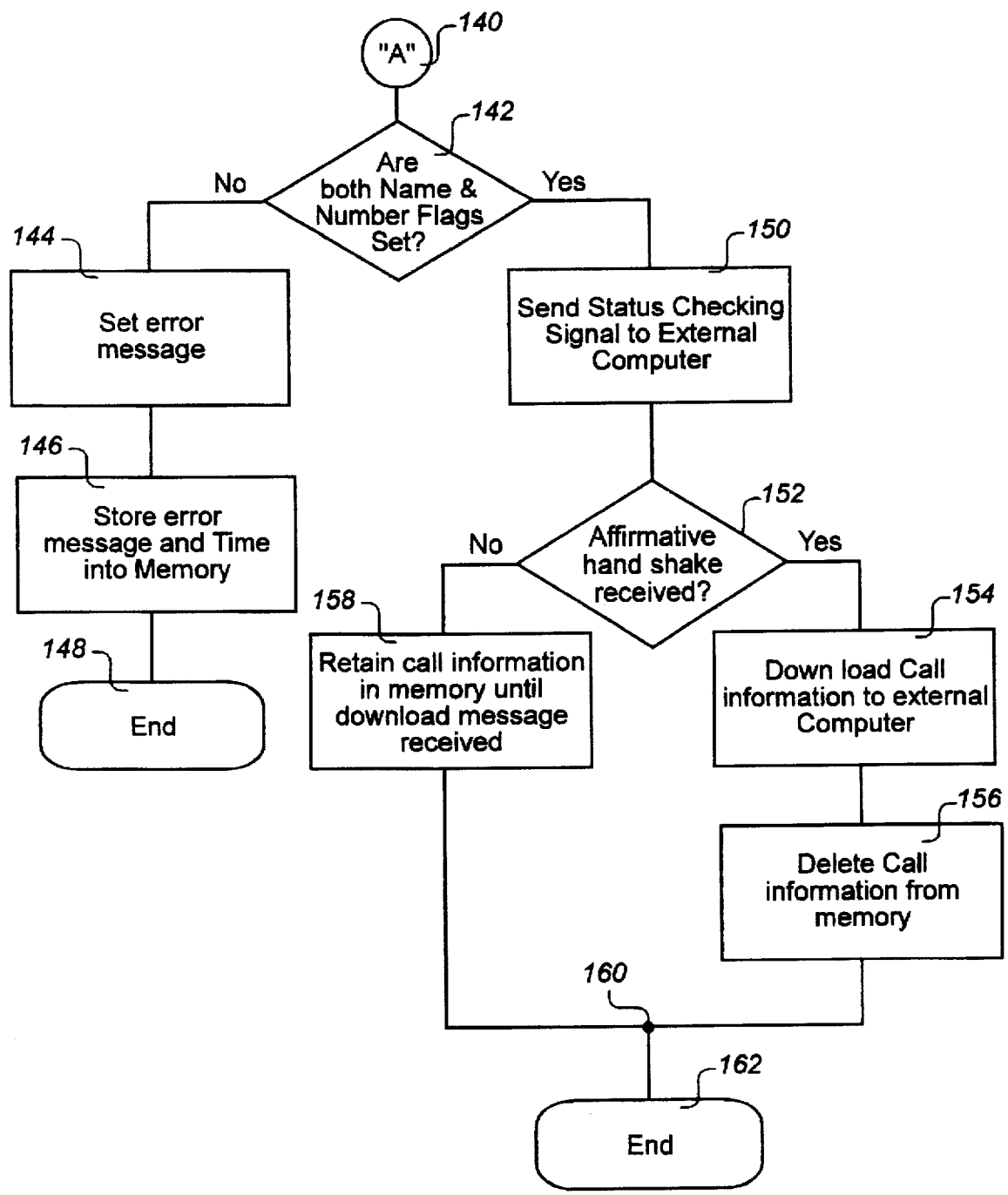

Continuing now at step 140 in FIG. 4C (to complete the description of the handling an incoming call), the system checks to see if both the calling party's name and number fields are usable. If, at step 142, both of these fields contain an error indicator, an error statement and message are inserted through the conversion device 22 at step 144. The current caller's data is removed from further processing at step 146, and the error message is forwarded to the computer system.

The processing of an outgoing call signal is depicted in the flow diagram of FIG. 4B. Starting at step 128, the circuitry detects an outgoing call signal. The system extracts the dual tone multiple frequency data signals from the outgoing signal at step 130. The device passes through the DTMF signal as received directly to the microprocessor shown in FIG. 3. The microprocessor converts the DTMF tone into the called number at step 132. Next, the system attaches the time of the call and the line number the call was placed upon at step 134. The formatted signal representing the outgoing call is stored into device's memory at step 136, and the system proceeds to step 138 where the reference numeral "A" indicates the outgoing signal is hereafter processed in the same manner as the formatted signal representing the incoming call.

Figure 4D:
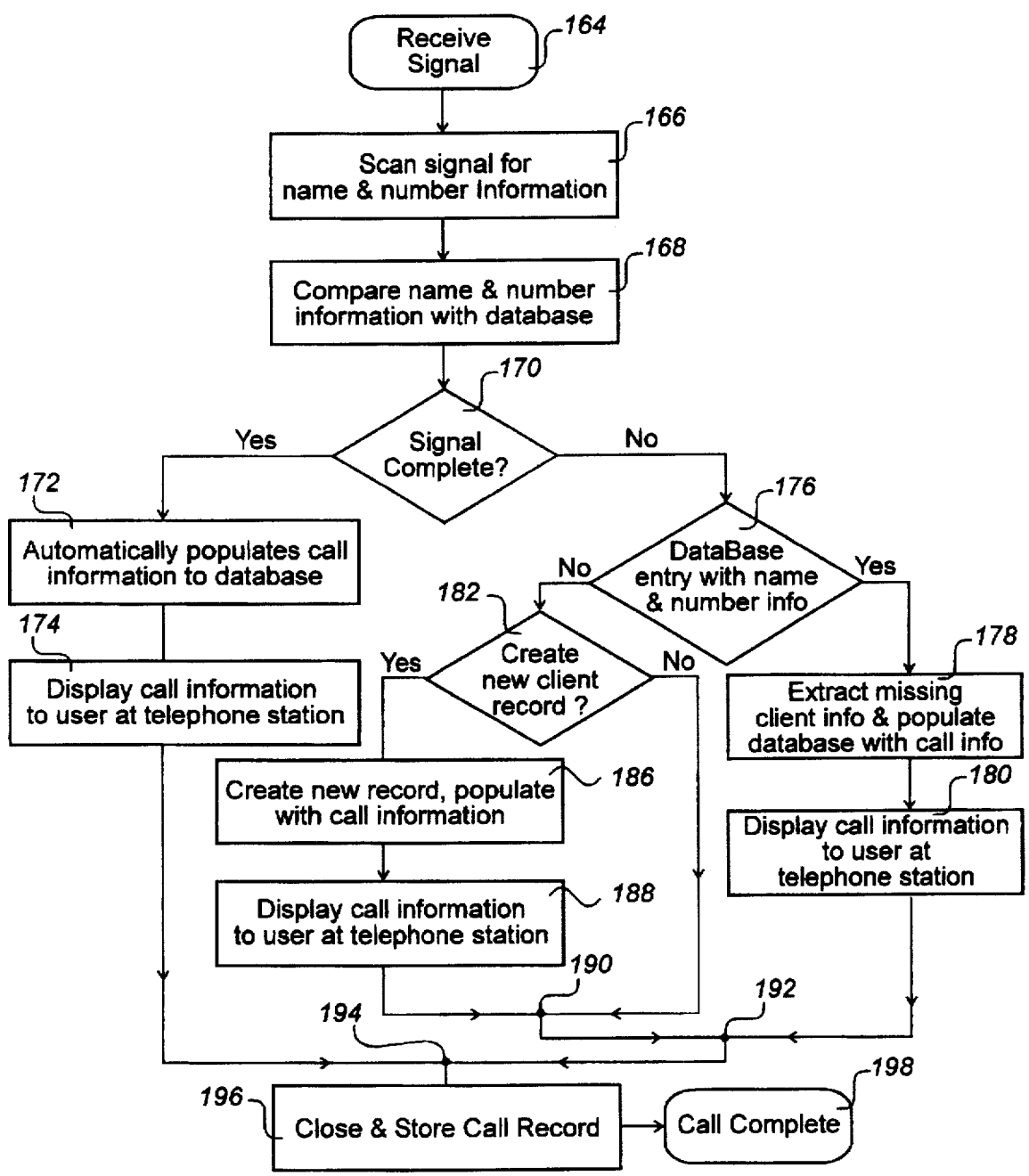

The formatted signal, either incoming or outgoing, is transmitted to the external computer system for further processing by the control software which operates generally as shown by the flow diagram of FIG. 4D.

Generally, the control software is designed to allow the visual depiction of a telephone caller's information in part or in total. The information is received from the conversion device 22 and placed in a readable format for on-screen display. As previously mentioned, the conversion device 22 converts the telephone signal, either incoming or outgoing, into the calling party's name, the calling party's phone number information, which includes and is not limited to specialized signal from Caller ID information as provided by the local telephone company, ANI information and signal as provided by both the local telephone company and the long distance provider, or ISDN information and signal as provided by both the local telephone company or other ISDN source. It is readily understood that the conversion device 22 is designed to be compatible with and can be customized to interpret specialized signal sources as provided from other vendors of such services. Additionally, the control software is also capable of specialized signal applications from such sources as 911, Enhanced 911 and specialized hardware and emergency service applications. The conversion device also includes in the information provided to the control software, the time and date of the call, the type of call (either incoming or outgoing), the telephone line that the call was placed on, or other pertinent information.

As shown in the flow diagram of FIG. 4D, the control software operates as follows. Initially, the signal is received by the computer system 34 from the conversion device 22 at step 164. The control software scans the signal for the name and number field information at step 166, and builds an index into the computer system's 34 relational database. The relationships between data received are shown generally in FIGS. 6A–6E, and will subsequently be discussed in greater detail.

Continuing with FIG. 4D at step 168, the system compares the name and number information received from the conversion device 22 with the data currently in the database. At decision point 170, the system determines if the signal was received complete and if there was a database entry for that name and number combination. If, at step 170, the signal was complete and there was a database entry, the system proceeds to step 172 where the controlling software automatically updates the database with information pertaining the instant call, and at step 174, displays call information to the user at a telephone station in the format of a phone log. This screen may be active for the duration of the call.

Figure 7A:
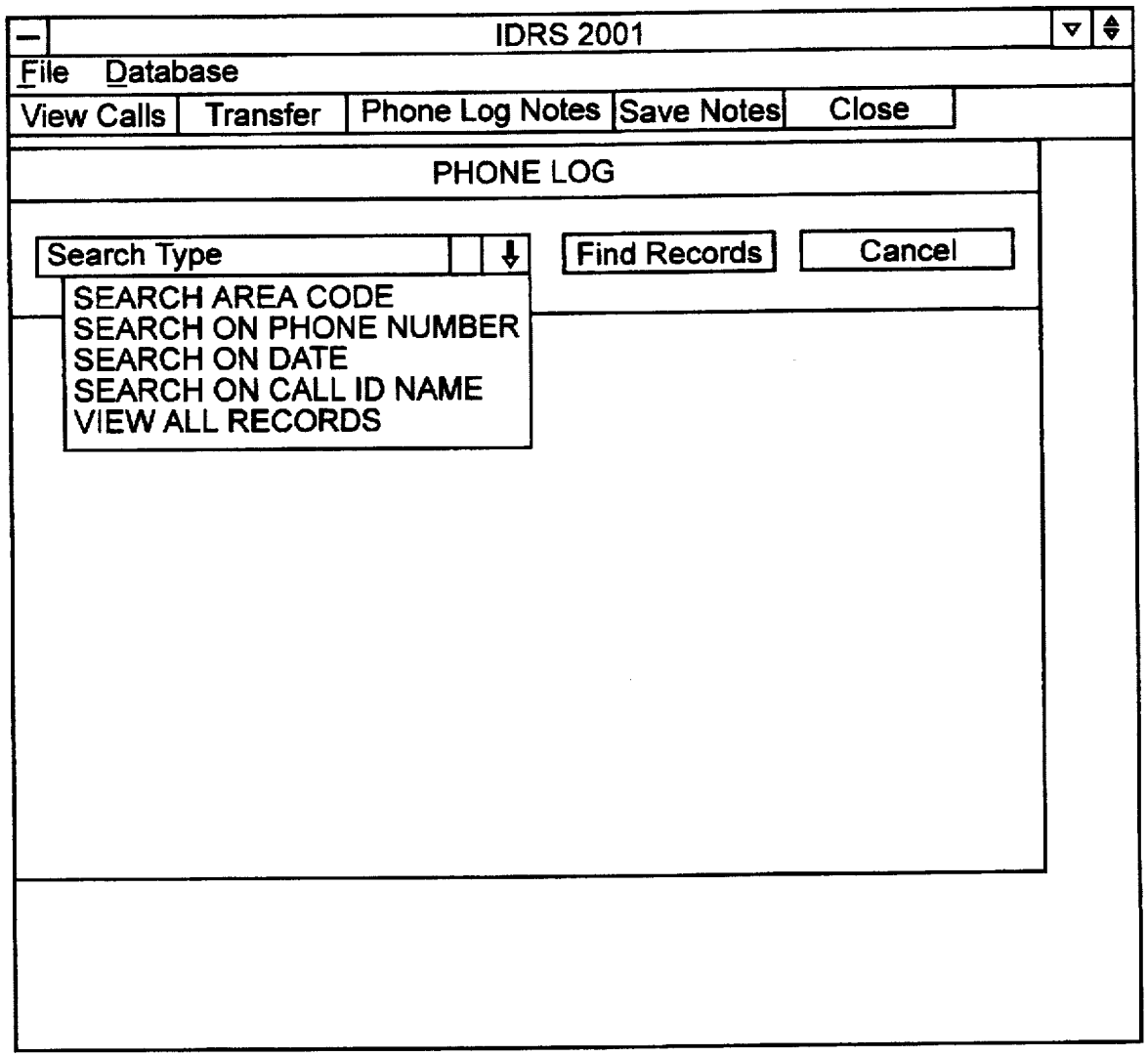

The user may view both current and prior calls when the phone log is active. When the user selects to view prior records, he or she may do so by searching on name, date, or time of day. FIG. 7A provides an example of a screen a viewer may see to initiate a search. While FIGS. 7A–7E are Copyright 1995 Security Products InterNational Inc. Inter-Continental Communication (17 U.S.C 401), other screen arrangements may be used to perform the same function. The user may also enter a note about that particular call and save the information as entered to a call or client's file (see FIG. 7B).

The phone log is the initial establishment link with the software database inter-relationship (see FIG. 7C). The phone log displays all basic caller information that has been transferred from the conversion device 22 and is formatted for a quick view. A quick view of the phone log depicts the line the call was made on, the telephone number, the time of call (start and end), the date, client's name, and indicates database records availability and history of past contacts with the calling or called party.

This basic phone log is directly tied to the several relational databases in the computer system 34 and interlaces the databases to other screens and search options. At the client's option and based upon settings, either preset in the control software or optionally changed by the client in the conversion device 22, the phone log will automatically populate the known information into the database and missing information is secured and populated from the attached relational data base called the client records, when such client records exist.

Figure 6A:
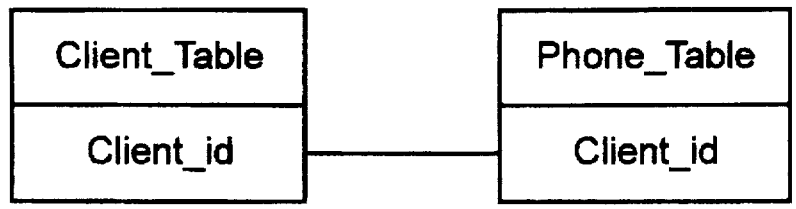
FIGS. 6A–6E illustrate the index to the relational database in the system of the present invention, and the database views available.
Figure 6B:
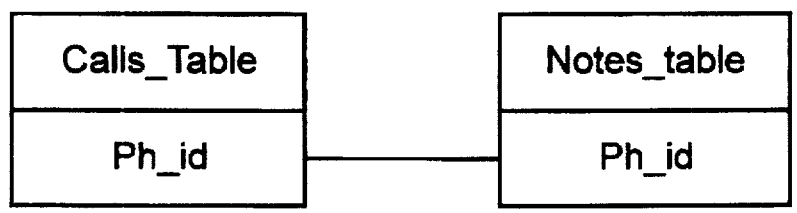
Figure 6C:
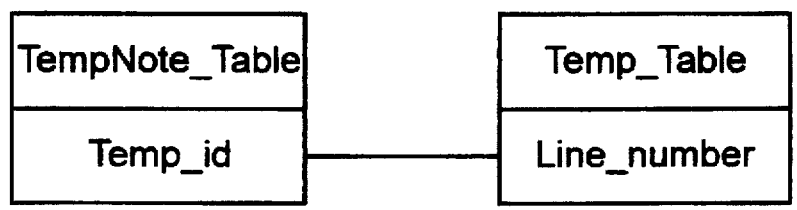
Figure 6D:
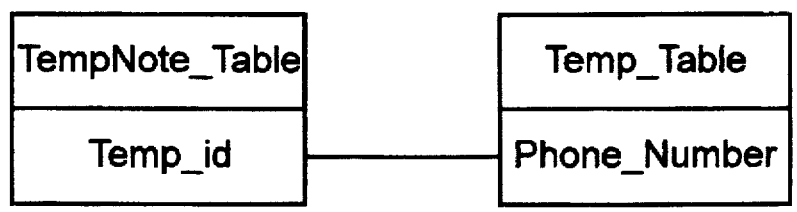
Figure 6E:
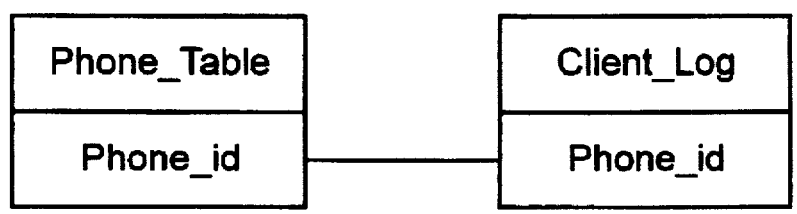

Population of the information displayed key on the telephone number and client's name, as shown in FIG. 6A. The control software automatically takes the telephone number and client's name as initially received from the conversion device 22 and searches the client records data base. If the telephone number and name is received intact, a search would be conducted on the client record file to determine if past contacts reflect note entries. Next, the name, number, and notes fields would be set to populate and display.

Population of the time and date fields are optional. The time of the start and end of the call is forwarded from the conversion device 22 to the control software in two formats. The first format is in standard hour and minute format, while the second format is in hour, minute and hundreds of seconds. The screen population for time is preset in the control software for the second format, however, modification is provided optionally to allow the time to be set at either option.

The date is set by the control software in the micro computer in the conversion device and past intact to the phone log. However, should the data for some reason be shattered upon receipt of the time and date field, the control software includes the ability to populate these fields based on the time stamp internal to the processor in which the software is running.

Resuming now at step 170 in FIG. 4D, if data is received from the conversion device 22 that is missing either the telephone number or name fields, a search of the corresponding database is conducted to secure the missing information at step 176. For example, if the phone number is missing yet the name is intact, a data base search is conducted on an alpha sorting arrangement for the name. When the name is secured and matches the information received by the conversion device, the main number will populate in the phone log. The same is also true should the name be missing.

The control software also includes a fail safe subsegment should there be no match in the database as to name or number of the calling party, which is shown at step 182. This will occur if there is no information, or client records in the relational database which match the instant calling party. At step 182, the user may click on the line of information in the phone log and proceed to step 186 and establish a new client record or search for a match in the client directory. If a match is found in the clients directory file, it may be populated on the phone log. If the user creates a new client record at step 182, both the phone log and the clients directory will be updated at step 186. The records are established in the connected and relational data bases, and the information is displayed in the phone log at step 188.

As previously discussed, the control software also includes a clients directory, which can be considered the hub relational database. The clients directory is a focal point as to caller or call placement information. Information may be secured on any client entered into the database from this screen through a simple click of the mouse or issuance of a command. The clients directory is a total listing of all clients entered into the system in an alphanumeric database configuration. Information to populate this database is entered through access and manual entry from the client entry screen, displayed on the display unit.

The directory log uses a combination of databases to secure and populate the required information. As such, direct ties in database applications and directories are shared by all segments of the control software. The directory directly ties to the phone log, client record files, calendar files, note files, printing directories, and sorting data programs to populate the screen and avail itself of printing options. Printing options include but are not limited to, the printer, fax, and computer monitor screens so connected.

The client records screen and fields displayed by the control software allow easy access to a specific client or file that has been developed by the end user (see FIG. 7D). The file contains all basic information on the client which includes but is not limited to: names, addresses, up to ten phone numbers (some telephone number fields are specific as to location), past calling history, (both incoming and outgoing), and revisable note files. The client records screen allows the end user to display prior calling history by day, date and time. From this option, the user may also display a specific previously made call for reference or generally review all calls to and from the client. The client records, in whatever format displayed, can be printed, as well as past call history, note fields and other information contained in the database. In short, the client record contains all history and information on the client. The control software allows this file to be downloaded to a disk, tape and/or hard drive for storage. The client records are also retrievable from the selected storage medium and will be up dated information is to be added.

All files accessed by the control software can be edited through the control software. As an edit occurs, the relational database is immediately refreshed with the new information to ensure an instant accurate display.

The system also includes a current status screen which is displayed by the control software (see FIG. 7E). The current status screen provides a view of the status of the conversion device 22 and the status of all calls being monitored by the control software. The display includes all telephone lines connected to the conversion device 22 and displays the line number, the telephone number called or calling at that time, the length of call in progress, and the caller or called person's name. This screen is viewed in read only format and may not be edited by the user. An automatic refresh feature allows the information on the screen to be kept current. As information changes, so does the display.

The current status screen is tied to the related databases in order to populate the information displayed on the screen into the databases.

The control software also includes a setup program which allows the end user to set up the features and functionality of the control software. Some of the functions and features that may be modified by the user include data speed, lines, registration and the user's name. The setup program provides for establishment of basic service required and setup only. The system setup may be modified at any time by the end user. However, the company name and serial number are locked into the control software once entered due to the cross check with the system security and status check command.

The system of the present invention also includes an automatic download option. This screen section gives the user specific options to backup or restore the captured caller or called party information. Options allow backup to external devices, computers, disk, etc.

Lastly, the system includes a calendar screen. The calendar screen is a tool to show daily activities of the user. The screen ties directly to the client record files and is set to display day, week, month, and year. The calendar is flexible and designed for planing and management functions. The calendar may be entered into from the client record or the screen icons as required.

There are several options available to the user of the system and method of the present invention, to enhance the system beyond the basic services. For example, the system includes the capability of a user to select the client's name, phone number, or complete address, and cross reference the selection from either the phone log, client records or directory and conduct a search for the missing or additional information on the caller or called party, either from a CD ROM disk type of directory as commonly available off the shelf, from a jukebox type of CD drive, or from a customized or off the shelf tape drive system, as is generally available in the marketplace. This application and option is unique to the control software of the present invention, and may be invoked while the call is in progress or after the call has been made. The control software will scan the CD ROM disk on the client's name, phone number (including area code), address, or ZIP Code, in order to secure the needed information. Upon securing the information from the provisioned source, the data is placed into a data storage file. Use of the information would be at the client's discretion. Such use includes but is not limited to: display the full information available on the client on the screen as derived from the source; automatically populate the client records file and directory databases, thus establishing a new client file or update the current client directory; allowing the user to selectively populate or secure the information required by the user for database population; allowing the missing fields from the phone log to be populated and stored in the appropriate relational database files.

A second option available in the system of the present invention is to directly tie into the telephone company's electronic directory service using a dedicated data line back to the telephone company. This option provides the client added flexibility in securing information on the calling party at the click of a mouse. This option performs the same functionality within the software as described above as it relates to database population and information storage and basic viewing options. With the click of a mouse or upon issuance of a single command, during the call or after the call has been made, a signal may be sent over the dedicated data line to the telephone company's electronic directory to obtain additional information. This option will not allow a general search of the telephone company's data base due to telephone company prohibitions, however, should these prohibiting factors be lifted than a general search will be performed.

In specific and controlled applications, both of the previously described options can be combined. Applications of the combined package include but are not limited to emergency services and governmental applications.

Also within the scope of the present invention are numerous user selectable database changes. For example, the user may assign a client number to the calling or called party. This number would be changeable by the user and provide unique identity to the caller or called party. This selectable code has been established to allow a total sort on the data base by client number versus telephone number or name. This identity can be used for verification of called or calling parties in a sub-billing or identification system. This may connect to an external database file for client identification.

The client number may also be used to allow the import or export of data to another type of existing database the user currently is using. If a selection is made by the user not to option the software for the insertion of the client ID number, the field and data is preset to be used as a call counting arrangement that will count the calls from a specific client, or provide total call counts during a specified time period.

Lastly, the system of the present invention includes various printing options. In a preferred embodiment, printing is controlled by the MS Windows Data Base Print Manager for hard copy, fax transmission and other applications. Access to printing information may be gained through the control names at the top of each screen. Print setup in the software is controlled by the user, who has several selectable options. One option allows the phone log to be printed for specified time frames, dates, hours, minutes or by client selected. Additionally, total client information is obtainable and printable including note fields, and client information from the control panel. Print options are also screen printable and do not have to be down loaded to the MS Windows Print Manager.

Also included in the system are the availability of usage reports. The control software is designed to allow the user to develop and print line usage reports or telephone usage reports for a specified period of time. The reports section also includes the option of showing the information from the display in a graph format for a quick view or analyzing the data.

To summarize, the system and method of the present invention are used generally as follows. A call is made, either into or out from a telephone station 26 including a conversion device 22 coupled with the computer system 34 of the invention. The voltage from the central office ringing signal is stripped from the line, and the microprocessor in the conversion device 22 scans the signal for the data stream as transmitted from the telephone company. The signal is then demodulated and placed into a special format for use with the external computing system 34.

Simultaneous with the call being connected at the telephone station 26, a signal is sent to the computing system 34 it is attached to. The call information in the formatted signal is used as an index to a database. Information in the database is then displayed on a display unit of the computing system 34. The display includes the line the call is made on or from, the telephone number called or received from, the time of the call from start to end, the date, the callers name, and any other database records available to show the history of the past contacts with the calling or called party. While the screen is active, the user may interactively update the display, or alternatively, search for secondary pertinent information.

Processing of an outgoing call is similar to that of an incoming call, except that rather than stripping the voltage off the incoming signal, the conversion device converts the DTMF tone into the called number, attaches the time of the call and the line number the call was placed, and then processes the information as previously described.

The invention claimed is:

1. A system for identifying incoming and outgoing calls and providing information pertaining thereto, comprising:

a conversion device adapted for being coupled to a telephone line, said conversion device including a detector for detecting caller identification information transmitted with an incoming basic signal and for detecting dual tone multiple frequency data signals from an outgoing basic signal, and a convertor for converting said detecting signals into a formatted signal;

said formatted signal including the number of the incoming or outgoing call, the line on which the call was placed or received, the name of the calling or called party, the date and timing of the call, and whether the call is incoming or outgoing;

a computer system in communication with said conversion device, said computer system including a signal receiver for receiving said formatted signal from said conversion device, a database for storing information about said formatted signal, and a database access system for retrieving information from said database, said computer system being external from said conversion device, said computer system being capable of being engaged in a network computer;

said database including a record for each of said incoming and outgoing calls, said record including when available a call number, whether the call is incoming or outgoing, a call name associated with the call, date and time of call, telephone line on which the call was placed or received, and being capable of storing a note input by a user;

said computer system having a reporting facility for creating reports from said database while said incoming or outgoing calls are in progress, said reporting facility allowing for the database to be searched by any item of information within said database, said database being fully relational;

said computer system having a database search facility for reconstructing caller identification information when said caller identification information is not completely detected on said incoming or outgoing basic signal, said search facility being capable of comparing a signal number against all numbers in the database and attaching a name to the signal number corresponding to a database matching number, said search facility being capable of comparing a signal name against all names in the database and attaching a number to the name corresponding to a database matching name;

a display unit in communication with said computer system, said display unit capable of displaying an interactive interface which includes information about said incoming calls and said outgoing calls;

said computer system having an editor for changing information displayed on said display unit while said information is displayed, and a calender facility so that call information can be displayed in a calender format;

said conversion device including a plurality of individual circuits, each of said plurality of circuits being capable of communicating with a separate phone line, at least some of said circuits also being capable of communicating with a substantially identical conversion device as claimed herein, whereby the system is capable of supporting a user specified number of phone lines;

said conversion device including:

an internal clock for attaching a time stamp to said database record;

a status checker for detecting whether said computer system is powered on and capable of receiving a formatted signal, and memory for storing a plurality of formatted signals when said computer system is not powered on and capable of receiving said formatted signal, said memory being capable of storing 2000 formatted signals;

a printer in communication with said conversion device for printing said call information; and a search facility to search an external database while an incoming or outgoing call is in progress.

2. The system of claim 1, further comprising a search facility to search an external database while an incoming or outgoing call is in progress.

3. The system of claim 2, wherein said database is a CD ROM disk.

4. The system of claim 2, wherein said database is a telephone company's directory.

5. The system of claim 2, wherein said data base is contained within at least one of another computing data base and separated data base.

6. The system of claim 2, further comprising a second search facility to search a second database.

7. The system of claim 6, wherein one of the databases is the telephone company's directory.

8. The system of claim 7, further comprising a third database, wherein at least one of the databases is proprietary.

9. The system of claim 2, wherein the database can associate more than one incoming or outgoing number with the name of a single party.

10. The system of claim 1, further comprising means for selectively blocking incoming calls.

11. The system of claim 1, wherein the system complies with all FCC standards.

12. The system of claim 1, further adapted to receive and secure the identification of cellular and marine operator calls.

13. The system of claim 1, wherein the system is portable and mountable within a surveillance unit, and is a remote identifier for use in legal wire tapping activities.

14. The system of claim 1, wherein exact call times of both incoming and outgoing calls are recorded through the use of 4 timing references; three of the timing references being internal to said computer system, and one of the timing references being external to said computer system.

* * * * *